J. R. MULDER.
CORN PLANTER.
APPLICATION FILED MAR. 12, 1914.
1,104,214.
Patented July 21, 1914.
2 SHEETS—SHEET 1.
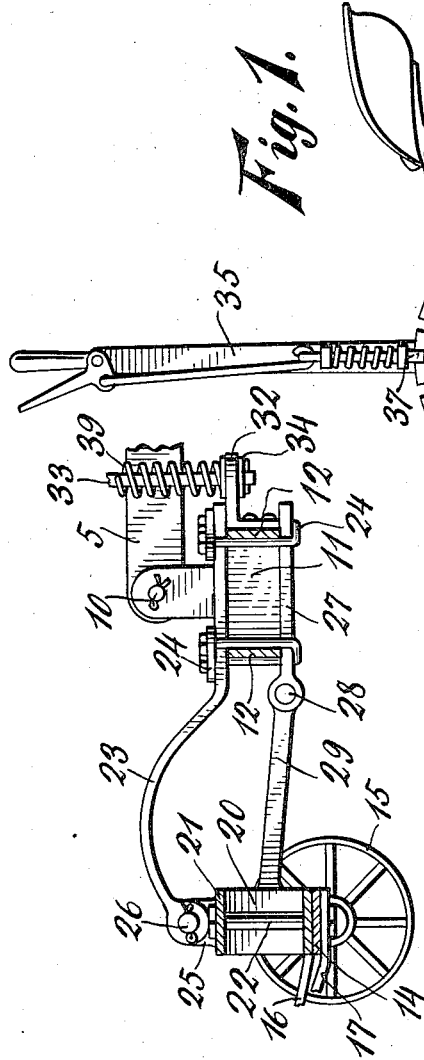
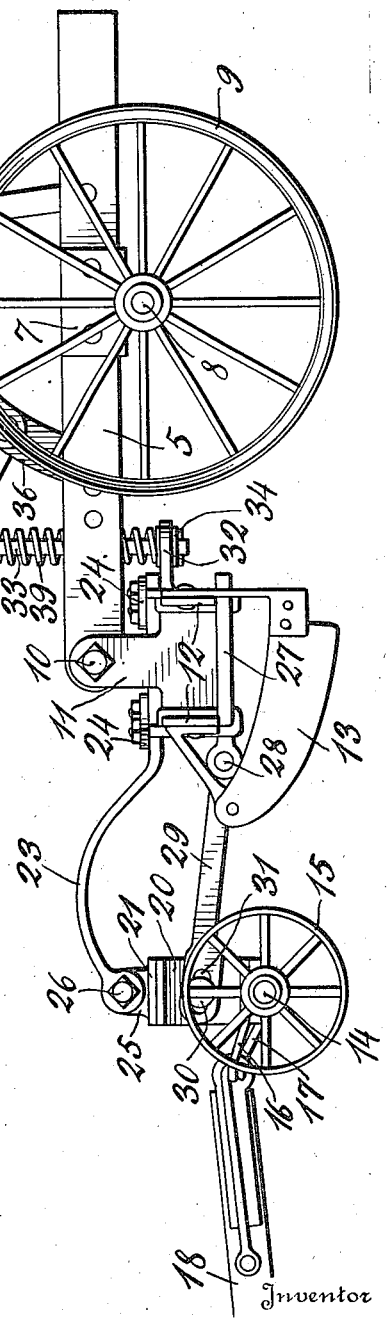
Inventor
Jelte R. Mulder.
Witnesses

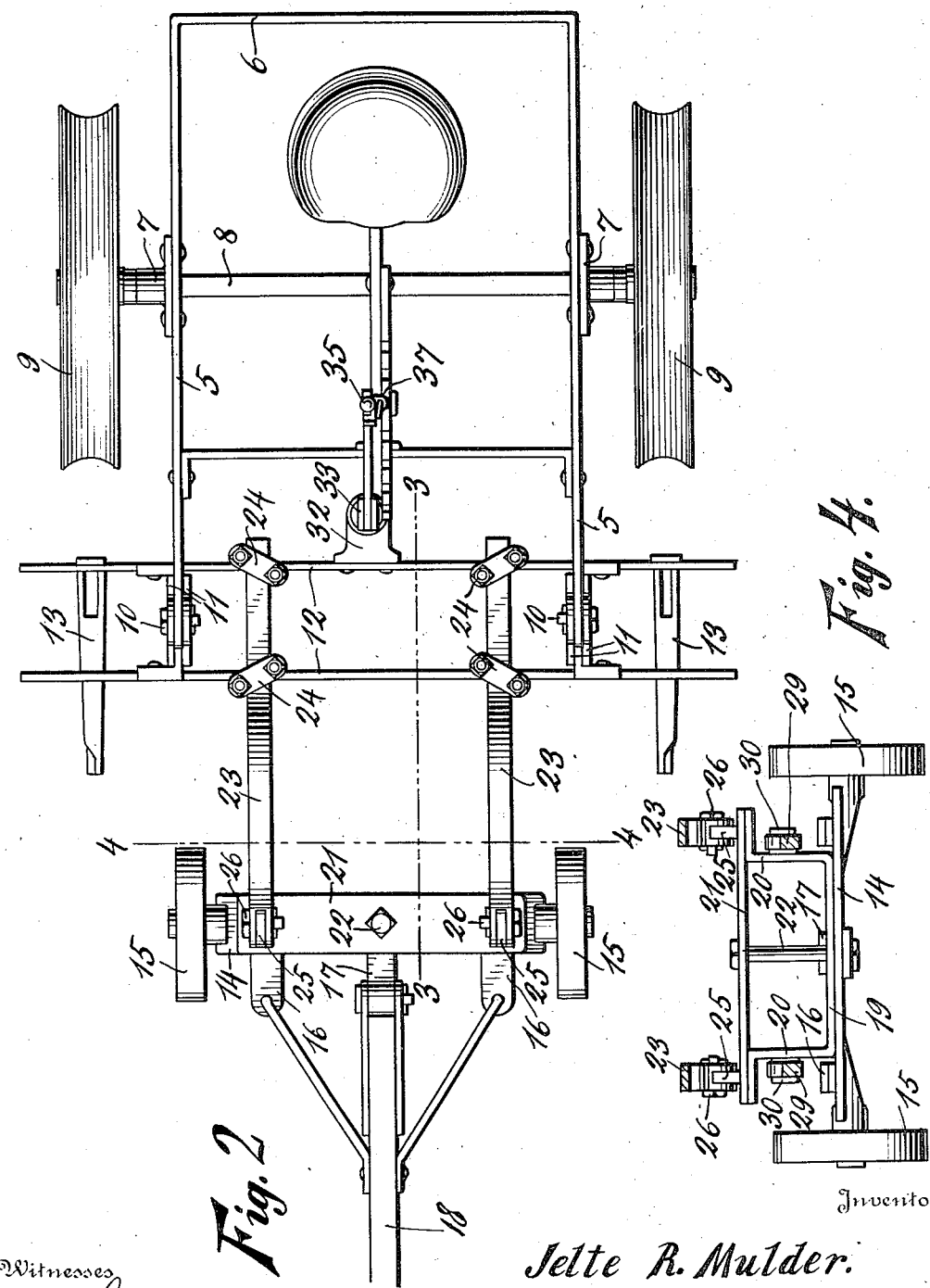

UNITED STATES PATENT OFFICE.

JELTE R. MULDER, OF ROSELAWN, INDIANA.

CORN-PLANTER.

1,104,214.

Specification of Letters Patent. Patented July 21, 1914.

Application filed March 12, 1914. Serial No. 824,159.

*To all whom it may concern:*

Be it known that I, JELTE R. MULDER, a citizen of the United States, residing at Roselawn, in the county of Newton and State of Indiana, have invented certain new and useful Improvements in Corn-Planters, of which the following is a specification.

This invention relates to corn-planters and has for its object to provide novel and improved means for raising and lowering that part of the machine which carries the furrow openers, and also to provide a structure whereby the weight of the machine is taken off the neck of the draft animals.

With these objects in view, the invention consists in a combination and arrangement of parts to be hereinafter described and claimed, reference being had to the accompanying drawings, in which—

Figure 1 is a side elevation of a corn-planter constructed in accordance with the present invention; Fig. 2 is a plan view; Fig. 3 is a section on the line 3—3 of Fig. 2, and Fig. 4 is a cross-section on the line 4—4 of Fig. 2.

Referring specifically to the drawings, the main frame of the machine comprises side bars 5 connected by a rear cross-bar 6. The side bars carry supports 7 for an axle 8 on which the ground wheels 9 are journaled. To the front ends of the side bars are pivoted, as indicated at 10, depending bracket members 11 carrying a pair of cross-bars 12 located one in front of the other in spaced relation. The ends of the cross-bars 12 carry furrow openers 13. The seed-boxes and other parts associated with the planting mechanism have not been illustrated as they form no part of the present invention.

In front of the furrow openers 13 is mounted a two-wheeled truck comprising an axle 14 having spindles at its end on which are journaled ground wheels 15. From the axle extend hounds 16 and a support 17 for the draft tongue or pole 18. On the axle is mounted a bolster comprising a plate 19 having upturned ends 20 which support a transverse plate 21. A king-bolt 22 passes through the axle and the parts 19 and 21, which permits the axle to swing to guide the machine.

The truck herein described is connected to the cross-bars 12 by a pair of beams 23 which are arched upward and made resilient. These beams are rigidly secured at their rear ends to the cross-bars 12 on top thereof, by clips or other suitable fastenings 24, and their front ends are pivotally connected to the truck, the plate 21 having upstanding lugs or ears 25 at its ends to which the front ends of the beams are pivoted, as indicated at 26. To the bottom of the cross-bars 12 are secured short beams 27, to the front ends of which are pivoted, as indicated at 28, draft links 29 which extend forward and are connected to the truck, the connection being made with the sides of the upturned ends 20 of the bolster plate 19 by pivot bolts 30 which pass through slots 31 in the forward ends of the links.

To the rear cross-bar 12 is fastened an outstanding ear 32 through which slidably passes a stem 33 having at its lower end, below the ear, an abutment 34. The upper end of the stem is connected to a hand lever 35 fulcrumed on a bracket 36 carried by the main frame of the machine. The hand lever has the usual locking means 37. Between the ear and an abutment 38 on the stem, a spring 39 is coiled around the latter, whereby the furrow openers 13 are held yieldingly in lowered position.

In operation, to lower the furrow openers 13 into operative position, the hand lever 35 is swung forward, whereupon the front end of the main frame tilts downward carrying with it the furrow openers. To elevate the furrow openers, the hand lever is swung back to tilt the front end of the main frame upward. In either position, the weight of the machine is borne by the front truck and is therefore taken off the draft animals.

The draft links 29 provide a pivotal connection between the front truck and the main frame of the machine which, together with the sliding connection between the hand lever 35 and the ear 32, holds the furrow openers 13 yieldingly in operative position. The resiliency of the beams 23 allows this yielding action to take place.

While the invention is designed primarily for corn-planters, it is not limited to such, but may with equal facility, be applied to other agricultural machinery. The preferred embodiment of the invention has been illustrated, but it is to be understood that various changes and modifications in the structural details may be made without departure from the scope of the invention as claimed hereinafter.

I claim:

1. The combination of a wheeled frame having a pivoted part at its forward end, a truck in front of said pivoted part, draft links pivotally connecting the truck to the pivoted part, resilient arched beams connecting the truck and the aforesaid pivoted part, a hand lever carried by the wheeled frame, and an operative connection between said hand lever and the pivoted part.

2. The combination of a wheeled frame having a pivoted part at its forward end, a truck in front of said pivoted part, said truck comprising an axle, a bolster, a kingbolt connecting the axle and the bolster, and wheels on the axle, draft links connecting the bolster of the truck to the aforesaid pivoted part, a hand lever carried by the wheeled frame, and an operative connection between said hand lever and the pivoted part.

3. The combination of a wheeled frame having a pivoted part at its forward end, a truck in front of said pivoted part, said truck comprising an axle, a bolster, a kingbolt pivotally connecting the axle and the bolster, and wheels on the axle, draft links connecting the bolster of the truck to the aforesaid pivoted part, resilient arched beams connecting the bolster and the pivoted part, a hand lever carried by the wheeled frame, and an operative connection between said hand lever and the pivoted part.

In testimony whereof I affix my signature in presence of two witnesses.

JELTE R. MULDER.

Witnesses:
S. J. LEHRER,
H. G. BATCHELOR.